Figure 1:
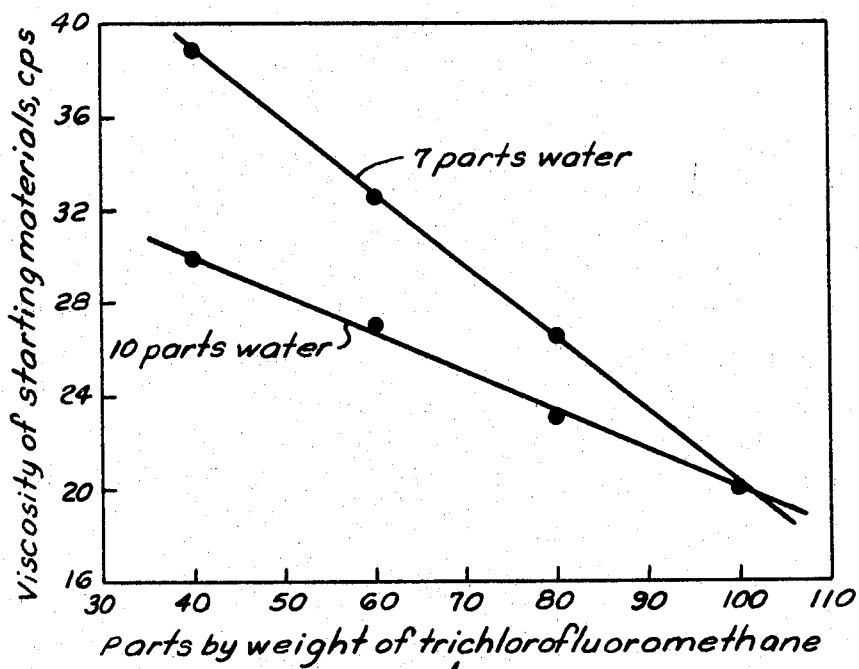

INVENTORS
Alfred E. Rosecrans
Calvin N. Goeders

| | Top | | | |
|---|---|---|---|---|
| 60 | 68 | 69 | 70 | 71 |
| 69 | 68 | 67 | 67 | 70 |
| 60 | 64 | 65 | 66 | 66 |
| 54 | 55 | 55 | 56 | 60 |
| 50 | 50 | 50 | 52 | 55 |
| 60 | 62 | 61 | 60 | 60 |
| 58 | 58 | 56 | 55 | 51 |
| 55 | 55 | 50 | 41 | 35 |

Side / Center / Bottom

INVENTORS.
Alfred E. Rosecrans
Colvin N. Goeders
BY
ATTORNEY

United States Patent Office 3,386,927
Patented June 4, 1968

3,386,927
METHOD FOR MAKING POROUS
POLYURETHANE FOAMS
Alfred E. Rosecrans and Calvin N. Goeders, Midland,
Mich., assignors to The Dow Chemical Company, Midland, Mich., a corporation of Delaware
Filed Aug. 31, 1964, Ser. No. 393,046
10 Claims. (Cl. 260—2.5)

This invention concerns a method for making open cell polyurethane foams of high porosity. It relates more particularly to a method for making flexible open cell polyurethane foams having a predetermined porosity and pertains to the use of such porous foam as filters for removing suspended particles from fluids, especially gases, e.g. air.

It is known to make open cell, flexible polyurethane foams by reacting an organic polyisocyanate with a polyester, a polyglucol, or a polyether polyol, containing reactive hydroxyl groups in the molecule in the presence of water and excess isocyanate to provide carbon dioxide in situ as a blowing agent to expand the reacting mass and form a foam, or in admixture with volatile inert organic fluids such as alkanes, alkenes, halogenated alkanes, ethers, or mixtures of two or more of such compounds as auxiliary or as sole blowing agent to produce open cell foams.

Polyurethane foams prepared by the aforementioned procedures are useful for a variety of purposes in the home and industry, but are often of lower porosity than is desired for many purposes, e.g. for use as sponges or filters, which restricts greatly their use for purposes for which they are otherwise well suited.

It is common practice to treat flexible or open cell polyurethane foams in various ways to improve the porosity or breathability of the foam or to make the foam more hydrophilic. Among methods for treating polyurethane foams to make them more porous or increase the porosity thereof are: The method disclosed in Canadian Patent No. 667,728 to S. Chess, or in Belgium Patents Nos. 543,362 and 590,368 to J. Bauer, wherein a polyurethane foam is treated with an aqueous sodium hydroxide solution, then passed between squeeze or crushing rolls whereby the cell walls or membranes are broken down or destroyed to provide a more porous foam; the method disclosed in Canadian Patent No. 638,083, or British Patent No. 871,291, for making a hydrophilic foamed polyester urethane which consists in contacting the foam with an aqueous solution of an alkali metal sulfite or a bisulfite at a pH between 5.5 and 13 and at temperatures between about 20° and 100° C.; the method disclosed in Canadian Patent No. 620,248, or British Patent No. 931,853; which consists in modifying the physical properties of a foamed, open-cell, cellular polyurethane structure by subjecting the material to the action of a hydrolyzing agent such as water or an aqueous solution of an acid or a base under hydrolyzing conditions; the method disclosed in Canadian Patent No. 659,817, British Patent No. 918,495, India Patent No. 78,159 and Japanese Patent 2,0731/63 to Ming Chih Chen, which consists in reacting a foamed polyurethane sponge with ozone until at least a portion of the membranes defining the sides of the cells of the sponge have been destroyed; and the method described in U.S. Patent No. 2,961,710 which consists in treating a polyester urethane foam sheet with a mixture of methylene chloride and silicone oil dissolved in petroleum oil to impregnate the same and subjecting the impregnated sheets to jets of high velocity air to rupture portions of the cellular structure to form a greater plurality of interconnecting cells.

The methods heretofore proposed for increasing the porosity of polyurethane foams have the disadvantage that they all require the steps of first preparing or obtaining the polyurethane foam and thereafter subjecting it to one or a plurality of sequential operations to provide a product of improved porosity, and softness.

Accordingly, it is a primary object of this invention to provide a method for making flexible open cell polyurethane foams of high porosity. Another object is to provide a method for making flexible open-cell polyurethane foams having a predetermined porosity. A further object is to provide a method for making flexible open-cell polyurethane foams having a porosity such that sheets of the foam are suitable for use as sponges or as filters for removing suspended solids from fluids, e.g., air or gases, without further treatment. Still another object is to provide a method of removing suspended solids, e.g. dust, from fluids, especially air, using the porous polyurethane foams as filter media. Other and related objects may appear from the following description of the invention.

According to the invention, flexible, open-cell, polyurethane foams having a low density, e.g. 0.7 pound per cubic foot or lower, a high degree of porosity such that sheets or pads of the porous foam are suitable for use as sponges or as filters, directly as prepared, without treatment other than the cutting of the sheet from the foamed bun or load, can readily be prepared by reacting an organic polyisocyanate with a polyhydroxy-containing organic compound such as a polyester, a polyglycol, or a polyether polyol, having two or more reactive hydroxyl group in the molecule, or a mixture of two or more of such polyesters or polyols, in admixture with a small amount, e.g. from 6 to 12 parts of water, and an inert volatile organic fluid foaming agent in an amount between about 30 and 100 parts, sufficient to provide a liquid mixture of the starting materials having a high degree of fluidity, e.g. an absolute viscosity between about 20 and about 100 centipoises at 25° C., and catalysts for both the water reaction and the organic hydroxyl reaction such as tertiary amines, or mixtures of amines, e.g. triethylenediamine, diethylenetriamine, N-ethylmorpholine, N-methylmorpholine, and stannous octoate, stannous oleate, dibutyltin dilaurate or dibutyltin dioctoate, together with cell regulating agents, e.g. polysiloxane-polyoxyalkylene block copolymers prepared in accordance with the disclosure of U.S. Patent No. 2,834,748. The cell regulating agents, cell stabilizers or cell forming surfactants can be used in amounts of from about 1 to 8 parts, preferably from 1 to 4 parts, by weight per 100 parts by weight of the polyhydroxyl containing compound starting material used.

It is improtant that the liquid mixture of the starting materials, essentially a mixture of all of the ingredients except the catalyst have a high degree of fluidity, preferably a value within the range specified, so that upon reaction and foaming of the mixture containing the catalyst the liquid carried upward within the cells of the rising foam not only results in the formation of extremely thin cell walls which rupture or readily dissolve in the liquid, but also results in the liquid draining downward and flowing counter-current to the rising foam into the more reactive exothermic regions of the mass where it is in turn reacted to produce more foam, the overall result being the formation of a low density, highly porous, open-cell, polyurethane foam directly as prepared from the starting formulation or recipe.

In general, the recipes employed for making the flexible open-cell highly porous polyurethane foams by the method of the invention, require the employing of a greater proportion of water and a substantially greater proportion of a volatile inert organic fluid foaming agent than has heretofore been used in the making of polyurethane foams and in a ratio to one another such as to avoid the occurrence of an extremely vigorous or runaway exothermic reaction. In this connection, the water can be used in amounts of from about 6 to 12 parts by weight per 100 parts of the polyester or polyol starting material, and the volatile organic blowing agent can be used in amounts that may range from about 20 to 120 parts by weight per 100 parts of the polyester or polyol starting material, although the parts by weight of the blowing agent actually used will vary widely depending upon its kind and chemical composition, i.e. whether alkane, alkene, haloalkane, or ether, and is in part determined by the kind and chemical composition and structure of the polyhydroxyl-containing compound employed.

It is also important that the catalyst be a mixture of amines and stannous salts of fatty acids such as a mixture of triethylenediamine, diethylenetriamine, N-ethylmorpholine or N-methylmorpholine and stannous octoate or stannous laurate. Best results are usually obtained by mixing or blending the catalyst with the polyether polyol or polyester starting material prior to admixing said reactants with the polyisocyanate.

The flexible, open-cell, highly porous, polyurethane foams can be prepared according to the invention by reaction of hydroxy polyesters, polyesteramides or polyether polyols with an organic polyisocyanate to form an elastomeric branched or linear polyurethane. Among suitable polyurethane materials are those described in U.S. Patents Nos. 2,577,279; 2,676,157; 2,764,565; 2,866,774; 2,948,691; 3,072,582; 3,080,329; and 3,102,875. Useful polyesters and/or polyesteramides includes those obtained by condensing a polybasic acid such as adipic acid, sebacic acid, phthalic acid or mixtures thereof with polyglycols or a polyhydric alcohol such as propylene glycol, diethylene glycol, glycerol, sorbitol, pentaerythritol, triethanolamine, or di(beta-hydroxyethyl)ether. The polyol starting material can be a polyglycol such as a polyalkylene glycol, e.g. polypropylene glycol, polyethylene glycol or a mixed propylene ethylene polyglycol, or polyether polyols such as the reaction product of a polyhydric compound such as glycerol, pentaerythritol, sorbitol, mannitol, sucrose, trimethylol propane, pentaglycerol, or an aromatic polyhydroxy compound such as dihydroxybenzene, or bisphenol A, with propylene oxide or a mixture of ethylene oxide and propylene oxide to form a corresponding polyether polyol having from 2 to 8 hydroxyl groups in the molecule and an OH equivalent weight of 500 or above.

Broadly, any of the prior art polyesters, polyisocyanate modified polyesters, polyesteramides, polyisocyanate modified polyesteramides, polyalkylene glycols, polyisocyanate modified polyalkylene glycols, polyether polyols and polyisocyanate modified polyether polyols having an OH equivalent weight of 500 or greater can be employed in the process to form the flexible open cell polyurethane foams.

Among organic polyisocyanates that can be employed are hexamethylene diisocyanate, tolylene 2,4- or tolylene 2,6-diisocyanate, diphenylmethane diisocyanate, m-phenylene diisocyanate, p-phenylene diisocyanate, naphthalene diisocyanate, dimethyldiphenylmethane diisocyanate, dianisidine diisocyanate, propylene-1,2-diisocyanate, butylene-1,3-diisocyanate, hexylene-1,6-diisocyanate, cyclohexene-1,2-diisocyanate and polymethylene polyphenyleneisocyanate. A mixture of approximately 80 percent by weight of tolylene, 2,4-diisocyanate and about 20 percent tolylene 2,6-diisocyanate is available commercially, as is polymethylene polyphenyleneisocyanate "PAPI." The polyisocyanates can be used in amounts corresponding to approximately a chemically equivalent amount of NCO groups for each reactive hydrogen atom in the starting materials, and in general is employed in an amount from 0.90 to 1.10, preferably from about 0.95 to 1.05, NCO group per chemically equivalent OH group in the total polyester or polyol and water starting materials used.

The polyurethane foam can be prepared in a single-type process which consists in blending the hydroxyl-containing material with the organic polyisocyanate and water, the volatile organic blowing agent, together with catalysts, surface active agents, or other auxiliary agents, in the desired proportions in a common mixing chamber from which the blended and reacting mixture is discharged into a mold or suitable container wherein it is allowed to rise or foam to a cellular product. Alternatively, the polyurethane foam can be prepared by a prepolymer process wherein the hydroxyl-containing material is reacted with sufficient polyisocyanate to form an intermediate reaction product containing isocyanate groups, i.e. a prepolymer, and this product is then reacted with water, catalysts, surface active agents, or other auxiliary agents, in the presence of the volatile organic blowing agent to form the final mixture that reacts and foams to a cellular product.

It is important, as previously pointed out, in making the polyurethane foam that the viscosity of the initial mixture of the reactants be such that the mixture has a high degree of fluidity, preferably a viscosity within the range of from about 20 to 40 centipoises, in order to obtain the flexible open-cell polyurethane foams having good porosity as initially prepared.

The porosity or breathability of the foam product can be varied by change in the viscosity of the mixture of the starting materials as shown in the accompanying drawings. FIG. 1 of the drawing shows the change in viscosity as accomplished in a given recipe formulation by change in the proportion of the volatile organic fluid blowing agent employed. Change in the viscosity of the starting materials can also be made by change in both the proportion and kind of volatile organic fluid foaming agent used and also by change in the proportion of water employed as is also shown in FIG. 1 of the drawing.

Figure 2:
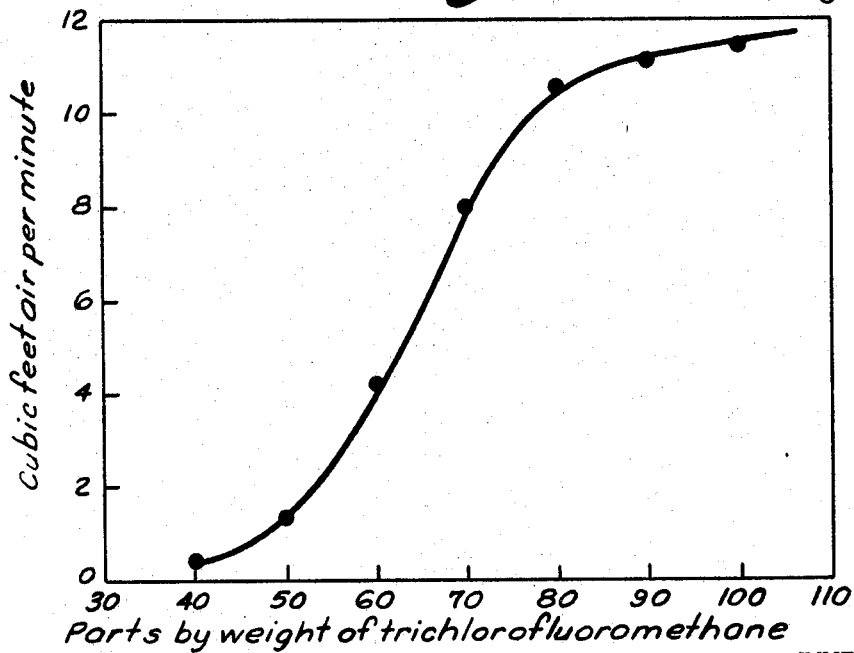

FIG. 2 of the drawing shows the rate of flow of air in cubic feet per minute through a test piece of the foam prepared from a given recipe versus the parts by weight of trichlorofluoromethane blowing agent per 100 parts by weight of the polyol used in making the polyuethane foam.

Figures 3, 4:
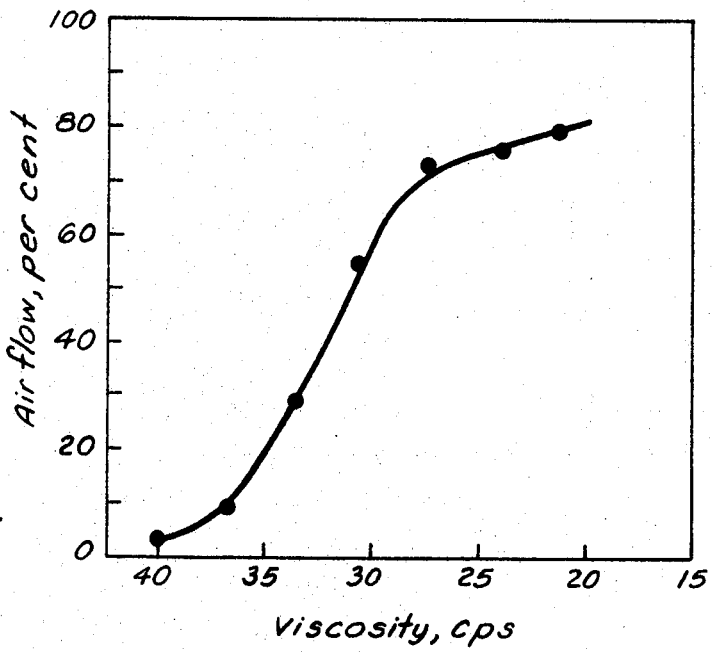

FIG. 3 of the drawing shows the percent of air flow through the foam versus the viscosity of the mixture of starting materials.

FIG. 4 illustrates an end view in elevation of a quarter-section of a foam bun and shows the percent flow of air through test pieces of the foam having the dimensions 1½ x 1½ inches by 1-inch thick cut from the face of a ¼-section of a trimmed foam bun, 8 inches high by 7½ inches wide.

In practice, the polyhydroxyl compound, e.g. a polyether polyol, is mixed with the catalyst materials such as triethylenediamine, diethylenetriamine, N-ethylmorpholine or N-methylmorpholine, and stannous octoate, and with the water and volatile organic blowing agent, preferably trichlorofluoromethane, in the desired proportions to form a liquid mixture of said ingredients having an absolute viscosity of from about 20 to 40 centipoises at 25° C. The mixture is pumped to a mixing head wherein it is rapidly blended with a cell regulating agent such as a silicone surfactant and a polyisocyanate, e.g. tolylene diisocyanate or polymethylene polyphenyleneisocyanate, also pumped to the mixing head. The resulting mixture is discharged into a mold, suitably an open corrugated paper box or a trough of paper on a moving belt where it is allowed to react and foam at ambient pressure.

The following examples illustrate ways in which the principle of the invention has been applied, but are not to be construed as limiting its scope.

EXAMPLE 1

A polyether urethane foam was prepared by reacting tolylene diisocyanate with a polyether polyol consisting of the adduct, or reaction product, of glycerine with propylene glycol to form a polyol product having an average molecular weight of 3000, employing a recipe as follows.

| Ingredients: | Parts by weight |
|---|---|
| Polyether polyol (mol. wt. 3000) | 100 |
| Tolylene diisocyanate (1.05 Index).[2] | |
| Water | 7 |
| Triethylenediamine | 0.2 |
| Diethylenetriamine | 0.4 |
| N-ethylmorpholine | 0.2 |
| Stannous octoate | 0.3 |
| Silicone oil [1] | 2.0 |
| Trichlorofluoromethane | 40 |

[1] The silicone oil was a commercially available alkyl silane polyoxyalkylene block copolymer having the formula

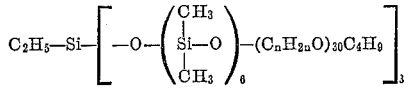

wherein ($C_nH_{2n}O$) is mixed polyoxyethylene-polyoxypropylene block copolymer containing about 17 oxyethylene units and about 13 oxypropylene units, and of the type disclosed in U.S. Patent No. 2,834,748.

[2] The term "1.05 Index" means that the tolylene diisocyanate was used in an amount corresponding to 1.05 NCO group for each chemically equivalent OH group in the polyol and the water starting materials.

The ingredients were blended by pumping, separately, and mixtures of two or more of the same, into a common mixing head wherein they were rapidly mixed with one another in the proportions set out in said recipe. The resulting mixture was discharged into an open cardboard container, having the dimensions of 20 x 48 inches by 12 inches deep, as a mold, to form a layer of the mixture about 0.5 inch deep. The layer was allowed to foam at ambient conditions. A foam bun completely filling the container and about 16–18 inches deep was obtained in a period of about 2 minutes. The foam bun was allowed to cure by standing at room temperature for 24 hours. Thereafter, test pieces were cut from the foam bun. These test pieces were used to determine the properties of the foam employing procedures similar to those described in A.S.T.M. D–1564–59T. The foam was also examined for its cell size and tested for its porosity or breathability by determining the rate of flow of air through a test piece employing procedures as hereinafter described. The product was a flexible open cell polyether urethane foam having the properties:

| | | |
|---|---|---|
| Density | lbs./cu. ft. | 0.6 |
| Cells | number/in. | 40 |
| Air Flow | cu. ft./min. | 9 |
| Compression set | percent | 15 |
| Tensile strength | lbs./sq. in. | 5 |
| Elongation | percent | 175 |
| Resiliency | do | 35 |
| 4″ ILD (at 25%) | lbs. | 20 |
| Breathability | percent | 60 |

EXAMPLE 2

A polyether urethane foam was prepared by reacting tolylene diisocyanate with a polyether polyol similar to that employed in Example 1 using the recipe:

| Ingredient: | Parts by weight |
|---|---|
| Polyether polyol (mol. wt. 3000) | 100 |
| Tolylene diisocyanate (1.05 Index). | |
| Water | 7 |
| Triethylenediamine | 0.2 |
| Diethylenetriamine | 0.4 |
| N-ethylmorpholine | 0.2 |
| Stannous octoate | 0.7 |
| Silicone oil | 3.0 |
| Methylene chloride | 32 |

The procedure for making the foam was similar to that employed in Example 1. The product was a flexible open cell polyurethane foam having a density of 0.5 lb./cu. ft., a cell size corresponding to from 40–50 cells per linear inch of surface, a porosity corresponding to an air flow of 8.4 cu. ft./min. through a test piece of the foam 1.5 x 1.5 inches square by 1 inch thick at a pressure difference of 1 inch of water, and a breathability of 56 percent. Other test pieces of the foam 1 inch thick were used to remove suspended dust from an air stream flowing at a linear rate of 167 ft./min. in a 3-inch square conduit and through a 3 inch square by 1 inch thick test piece of the foam. Ninety-five percent of the suspended dust particles were removed from the air stream and were trapped in the porous foam. The foam was an efficient filter.

EXAMPLE 3

In each of a series of experiments a polyether urethane foam was prepared by reaction of a polyether polyol and a diisocyanate employing the recipe:

| Ingredient: | Parts by weight |
|---|---|
| Polyether polyol [1] | 100 |
| Tolylene diisocyanate [2] (1.05 Index). | |
| Water | 7 and 10 |
| Triethylenediamine | 0.2 |
| Diethylenetriamine | 0.36 |
| N-ethyl morpholine | 0.24 |
| Stannous octoate | 0.85 |
| Silicone oil [3] | 2.0 |
| Trichlorofluoromethane | Variable |

[1] The polyether polyol starting material was the adduct of reaction product of glycerine with propylene oxide to form a polyether polyol having an average molecular weight of 3000.
[2] The tolylene diisocyanate was a commercially available product consisting of about 80 percent by weight of 2,4-isomer and about 20 percent of 2,6-isomer, and was used in an amount corresponding to a 1.05 index, i.e. an amount corresponding to 1.05 NCO groups for each chemically equivalent OH group in the polyether polyol and the water starting materials.
[3] The silicone oil was a commercially available alkyl silane polyoxyalkylene block copolymer having the formula

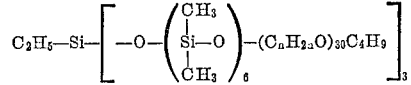

wherein $C_nH_{2n}O$ is a mixed polyoxyethylene polyoxypropylene block copolymer containing about 17 oxyethylene units and about 13 oxypropylene units, and of the type disclosed in U.S. Patent No. 2,834,748.

A mixture of the ingredients, without the stannous octoate, the triethylenediamine, the diethylenetriamine and N-ethylmorpholine catalysts, was prepared and the absolute viscosity in centipoises determined at 25° C. using a Brookfield Viscosimeter. In preparing the foam, the polyether polyol, the water, the triethylenediamine, the diethylenetriamine, the N-ethylmorpholine, and the trichlorofluoromethane were blended together in a holding vessel, at room temperature and atmospheric pressure. The mixture was pumped separately under about 30 pounds per square inch to a mixing chamber or head wherein it was blended rapidly with the stannous octoate, catalyst, the silicone oil, and the tolylene diisocyanate, each of which ingredients were separately pumped under pressures of from 600 to 1200 p.s.i. and metered into admixture with one another in the mixing head, to form a homogeneous blend that was discharged into an open cardboard container having the dimensions of 20 x 48 inches by about 12 inches deep, to form a layer about one-half inch deep. The blend was allowed to foam at room temperature. In each instance the material foamed to a height of from about 12 to 16 inches or more. The foamed bun was allowed to cure or age for 24 hours at room temperature. Thereafter, the foam was removed from the cardboard container and was cut into pieces or sheets. Test pieces of the foam were used to determine its properties employing procedures similar to those described in ASTM D–1564–59T. The foam was examined for its cell size, and was tested for porosity or breathability by determining the rate of flow of air therethrough under given conditions. The cell size was determined by observing the surface of the cut foam under a magnifying glass and counting the number of cells per inch of length of the foam surface in two directions at right angles to one another. The number of cells per inch is reported as the average number of cells per linear inch of the foam surface as determined for the two measurements. The procedure for determining the porosity of the foam was to place a 1.5 x 1.5 inch square test piece of the foam 1 inch thick against a coarse screen in the end of a conduit and pull air at room temperature through the test piece of foam by means of a vacuum at a rate corresponding to a pressure differential of 1 inch of water, then observe and measure the rate of flow of air through the test piece of foam in cubic feet per minute. Table I identifies the experiments and gives the parts by weight of the stannous octoate catalyst, water and the trichlorofluoromethane blowing agent, used in making the polyurethane foams according to the aforementioned recipe. The table also gives the viscosity of the mixture of the starting materials, without the catalysts. The table gives the properties determined for the foam, the size of the cells and the porosity, expressed in terms of cubic feet of air flowing through a 1.5 x 1.5 x 1 inch thick test piece of the foam per minute under a pressure differential of 1 inch of water at room temperature, and also expressed in terms of the percent of flow of air through the test piece of foam compared to the rate of flow of air through the test apparatus alone at 1 inch of water pressure differential.

TABLE I

| Run No. | Starting Materials | | | Foam Product | | |
|---|---|---|---|---|---|---|
| | F-11 Blowing Agent Parts | Water Parts | Viscosity, Cps. | Number of Cells per Inch | Porosity Air Flow | |
| | | | | | Cu. ft./min. | Percent |
| 1 | 40 | 7 | 39 | 40 | 0.4 | 3 |
| 2 | 50 | 7 | 36 | 40 | 1.3 | 9 |
| 3 | 60 | 7 | 32.5 | 40 | 4.2 | 29 |
| 4 | 70 | 7 | 29.5 | 35 | 8.2 | 55 |
| 5 | 80 | 7 | 26.5 | 35 | 10.6 | 73 |
| 6 | 90 | 7 | 23.3 | 30 | 11.15 | 76 |
| 7 | 100 | 7 | | 30 | 11.5 | 79 |
| 8 | 40 | 10 | 30 | | | |
| 9 | 50 | 10 | 28.3 | | | |
| 10 | 60 | 10 | 27 | | | |
| 11 | 70 | 10 | 25 | | | |
| 12 | 80 | 10 | 23 | | | |
| 13 | 90 | 10 | 21.7 | | | |
| 14 | 100 | 10 | 20 | | | |

FIG. 1 is of the drawing shows the change in viscosity of the starting materials with change in the proportion of F-11 (trichlorofluoromethane) used.

FIG. 2 of the drawing shows the change in the porosity or breathability of the foam obtained in Run Nos. 1–7, expressed as cubic feet of air flow per minute versus parts by weight of trichlorofluoromethane used per 100 parts by weight of polyol, and FIG. 3 shows percent flow of air through a test piece of foam as compared to unrestricted flow of air versus the viscosity of the solution of the starting materials.

EXAMPLE 4

In each of a series of experiments, a polyether urethane foam was prepared by reaction of a polyether polyol and a diisocyanate starting material similar to those used in Example 3, employing the recipe:

| Ingredient: | Parts by weight |
|---|---|
| Polyether polyol | 100 |
| Tolylene diisocyanate (1.05 Index). | |
| Water | 7 |
| Triethylenediamine | 0.2 |
| Diethylenetriamine | 0.4 |
| N-ethylmorpholine | 0.2 |
| Silicone oil | 2.0 |
| Stannous octoate | Variable |
| Trichlorofluoroethane | Variable |

The ingredients were blended together and were allowed to react to form a polyurethane foam employing procedures similar to those employed in Example 3, including the testing procedures to determine the properties of the foam product. Table II identifies the experiments and gives the parts by weight of stannous octoate catalyst and trichlorofluoromethane (F-11) blowing agent used in making the foam. The table also gives the viscosity in centipoises at room temperature of the solution of the starting materials. Table II also gives the properties determined for the foam product.

TABLE II

| Run No. | Starting Materials | | | Product | | | | | | | |
|---|---|---|---|---|---|---|---|---|---|---|---|
| | Stannous Octoate, Pts. | F-11, Pts. | Visc., cps. | Compression Set | Density, lbs./cu. ft. | Resiliency | Tensile Strength, lbs./sq. in. | Elongation, Percent | 4″ ILD | Number of Cells/Inch | Porosity Air Flow, Percent |
| 1 | 0.40 | 42 | 38.4 | | | | | | | 40 | 91 |
| 2 | 0.45 | 42 | 38.4 | | | | | | | 40 | 83 |
| 3 | 0.55 | 40 | 39 | 10 | 0.623 | 39 | 6.5 | 110 | 30 | 35 | 41 |
| 4 | 0.70 | 40 | 39 | 15 | 0.572 | 30 | 7.1 | 117 | 37 | 35 | 5 |
| 5 | 0.55 | 50 | 36 | 18 | 0.585 | 44 | 6.1 | 123 | 19 | 35 | 88 |
| 6 | 0.70 | 50 | 36 | 13 | 0.570 | 39 | 6.3 | 120 | 25 | 35 | 40 |
| 7 | 0.85 | 52 | 35.2 | | | | | | | 40 | 29 |
| 8 | 0.70 | 60 | 32.7 | 16 | 0.551 | 41 | 6.0 | 110 | 22 | 35 | 52 |
| 9 | 0.85 | 62 | 32.1 | | | | | | | 40 | 55 |
| 10 | 0.70 | 70 | 29.6 | 23 | 0.572 | 47 | 5.5 | 130 | 16 | 35 | 79 |
| 11 | 0.85 | 72 | 29 | | | | | | | 40 | 73 |
| 12 | 0.85 | 82 | 25.8 | | 0.645 | 44 | 6.7 | 91 | 30 | 35 | 77.5 |

EXAMPLE 5

A polyester urethane foam was prepared by reacting a polyester as hereinafter identified with tolylene diisocyanate employing the recipe:

| Ingredient: | Parts by weight |
|---|---|
| Polyester [1] (Hydroxyl No. 51) | 100 |
| Tolylene diisocyanate (1.05 Index) | 92.3 |
| Water | 7 |
| N-ethylmorpholine | 2 |
| Silicone oil [2] (DC 202) | 8 |
| Trichlorofluoromethane | 40 |

[1] Multron R-74, a viscous liquid resin having an absolute viscosity of about 1250 centipoises at 73° F., a hydroxyl number of about 50 and an acid number of less than 2.
[2] A silicone-glycol copolymer having a viscosity of about 1000 centistokes and a specific gravity of 1.04 at 77° F.

The mixture of the materials had a viscosity of 90 centipoises at 25° C.

The ingredients were blended with one another under pressure in a mixing head and were discharged therefrom into an open corrugated paper box and allowed to foam, employing procedures similar to those employed in Example 3. The product was an open cell flexible urethane foam having a density of 0.66 pound per cubic foot and a breathability of 75 percent.

In contrast, a polyester urethane foam prepared from a similar recipe, but without the trichlorofluoromethane as blowing agent and which blowing agent also acts to lower the viscosity of the mixture of starting materials, is found to consist substantially of closed cells and to have a breathability of only about 5 percent.

EXAMPLE 6

A polyether urethane foam was prepared by reaction of toluene diisocyanate with a polyol consisting of the adduct of propylene oxide with glycerine to form a polyether triol having an average molecular weight of 3000, employing the recipe:

| Ingredient: | Parts by weight |
|---|---|
| Polyether polyol | 100 |
| Tolylene diisocyanate (1.05 Index). | |
| Water | 7 |
| Triethylenediamine | 0.2 |
| Diethylenetriamine | 0.4 |
| N-ethylmorpholine | 0.2 |
| Stannous octoate | 0.5 |
| Silicone oil | 2.0 |
| Trichlorofluoromethane | 45 |

The ingredients were blended together in a mixing head and were discharged therefrom through a nozzle into an open corrugated paper container having the dimensions of 20 x 48 inches by 12 inches deep, in an amount of the liquid mixture sufficient to form a layer about 0.5 inch deep in the bottom of said container. The material was allowed to foam at ambient temperature. A foam bun completely filling the container and about 16 inches deep was obtained in a period of about 2 minutes. The foam bun was allowed to cure by standing at room temperature for a period of 24 hours. Thereafter, the bun was trimmed free of surface skin leaving a rectangular foam bun having the dimensions of 15 x 12 x 44 inches long. This bun was sliced vertically and cut in the middle at right angles to form 4 equal quarter sections 7.5 inches wide x 6 inches high x 22 inches long. Test pieces of the foam having the dimensions 1½ x 1½ inches by 1 inch thick were cut from the center face of one of the quarter sections. These test pieces were used to determine the porosity of breathability of the foam throughout the bun by determining the rate of flow of air through a test piece of the foam. FIG. 4 of the drawing give the percent breathability determined for the test pieces of the foam expressed as the percent of the flow of air through the foam. A value of 100 being the flow of air without resistance to the air stream. FIG. 4 also show the relative position of the test piece of the foam in the face of the quarter section of the bun from which it was cut.

We claim:

1. In a process for making a flexible polyurethane foam by reacting a polyhydroxyl-containing organic compound having an OH equivalent weight of at least 500 with an organic polyisocyanate in the presence of an amine catalyst and a stannous salt of a fatty acid catalyst, the improvement for making a flexible polyurethane foam containing predominantly open and interconnecting cells which comprises carrying out the reaction of (1) a polyether polyol having an OH equivalent weight of at least 500 and consisting principally of the reaction product of (i) propylene oxide or propylene oxide and a minor proportion of ethylene oxide, with (ii) an aliphatic polyol having from 2 to 8 hydroxyl groups in the molecule, and (2) an approximate chemically equivalent amount of an organic polyisocyanate in admixture with (a) from 6 to 12 parts by weight of water, (b) from 20 to 120 parts by weight of an inert volatile organic fluid blowing agent boiling below 110° C., and (c) from 1 to 8 parts by weight of a silicone surfactant, per 100 parts by weight of said polyether polyol starting material, said polyisocyanate being within the range of from 0.90 to 1.10 NCO groups per chemically equivalent hydrogen and OH groups in the polyether polyol and water starting materials and with the proviso that said mixture of starting materials (1), (2) and (a), (b), and (c) absent said catalysts, has an absolute viscosity between about 20 and about 40 centipoises at 25° C.

2. A process as claimed in claim 1 wherein the polyether polyol is the adduct of propylene oxide and glycerine and has an OH equivalent weight of about 1000.

3. A process as claimed in claim 1, wherein the volatile organic fluid foaming agent is a halogenated lower alkane.

4. A process as claimed in claim 1 wherein the volatile organic fluid foaming agent is trichlorofluoromethane.

5. A process for making a flexible open cell polyurethane foam which comprises reacting a polyether polyol consisting of the adduct of propylene oxide with a polyhydric alcohol having from 3 to 4 hydroxyl groups in the molecule and which adduct has an OH equivalent weight of at least 500 with an organic polyisocyanate in admixture with water in an amount between about 6 and about 12 parts by weight and an inert volatile organic fluid boiling below 110° C. as blowing agent in an amount between about 50 and about 100 parts by weight, per 100 parts by weight of said polyether polyol, said polyisocyanate being in amount corresponding to from about 0.95 to about 1.05 NCO groups for each chemically equivalent OH group in said polyether polyol and said water, and said reaction mixture initially having an absolute viscosity between 20 and 40 centipoises at 25° C. said reaction being catalyzed by a mixture of amines consisting of triethylenediamine, diethylenetriamine, N-ethylmorpholine and stannous octoate and containing from about 1 to 8 parts by weight of a silicone surfactant having the formula

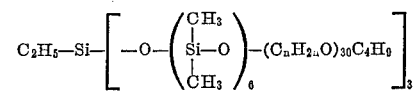

wherein $C_nH_{2n}O$ is a mixed polyoxyethylene polyoxypropylene block copolymer containing about 17 oxyethylene units and about 13 oxypropylene units.

6. A flexible open-cell polyurethane foam consisting of the reaction product of (1) a polyether polyol condensate of propylene oxide and a polyhydric alcohol having from 3 to 4 hydroxyl groups, which condensate has an OH equivalent weight of at least 500, and (2) water in amount of from about 6 to 12 parts by weight per 100 parts of said condensate (1), and (3) an organic polyisocyanate in amount sufficient to provide from 0.95 to 1.05 NCO group for each chemically equivalent reactive hydrogen and OH group in the water and said condensate, when reacted in admixture with an amine catalyst and a stannous salt of a fatty acid catalyst, from 1 to 8 parts by weight of a silicone surfactant and from 20 to 120 parts by weight of a volatile halogen substituted lower molecular weight alkane blowing agent having a boiling point below 110° C., per 100 parts of said condensate to form a liquid mixture of said condensate, said polyisocyanate, said silicone surfactant, said water and said halogen substituted alkane blowing agent about said catalysts, having a viscosity of from about 20 to about 40 centipoises at 25° C.

7. A flexible open-cell polyurethane foam as claimed in claim 6 wherein the condensate is the reaction product of glycerine and propylene oxide and has an OH equivalent weight of about 1000.

8. A flexible open-cell polyurethane foam as claimed in claim 6 wherein the volatile halogen substituted lower molecular weight alkane is trichlorofluoromethane.

9. A flexible open-cell polyurethane foam as claimed in claim 6 wherein the organic polyisocyanate is tolylene isocyanate.

10. A flexible open-cell polyurethane foam consisting of the reaction product of (1) a polyol consisting of a condensate of glycerine and propylene oxide having an OH equivalent weight of about 1000, (2) from 6 to 12 parts by weight of water per 100 parts by weight of said condensate, and (3) tolylene diisocyanate in amount sufficient to provide from 0.90 to 1.10 NCO group for each chemically equivalent reactive hydrogen and OH group in the water and said condensate, when reacted in admixutre with at least one amine selected from the group consisting of triethylenediamine, diethylenetriamine and N-ethylmorpholine, and stannous octoate as catalysts, and from 20 to 120 parts by weight of trichlorofluoromethane and from 1 to 8 parts by weight per 100 parts of said polyol, of a silicone surfactant having the formula

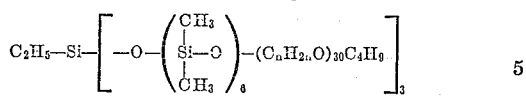

wherein $C_nH_{2n}O$ is a mixed polyoxyethylene polyoxypropylene block copolymer containing about 17 oxyethylene units and about 13 oxypropylene units said mixture of starting materials absent said catalysts, having an absolute viscosity between about 20 and about 40 centipoises at 25° C.

References Cited

UNITED STATES PATENTS

| | | | |
|---|---|---|---|
| 3,073,788 | 1/1963 | Hostettler et al. | 260—2.5 |
| 3,075,928 | 1/1963 | Lanham | 260—2.5 |
| 3,103,408 | 9/1963 | Chen et al. | 18—48 |
| 3,138,562 | 6/1964 | Nischk et al. | 260—2.5 |
| 3,194,773 | 7/1965 | Hostettler | 260—2.5 |

FOREIGN PATENTS

| | | |
|---|---|---|
| 926,414 | 5/1963 | Great Britain. |
| 1,241,345 | 8/1960 | France. |

OTHER REFERENCES

Sanders et al., Polyurethanes, Part II, Interscience Publishers.

DONALD E. CZAJA, *Primary Examiner.*

LEON J. BERCOVITZ, JAMES A. SEIDLECK, *Examiners.*

F. McKELVEY, *Assistant Examiner.*